US010833786B2

(12) United States Patent
Chiang et al.

(10) Patent No.: US 10,833,786 B2
(45) Date of Patent: Nov. 10, 2020

(54) MOBILE SERVICE REQUESTS TO ANY SOUND EMITTING DEVICE

(71) Applicant: GOOGLE LLC, Mountain View, CA (US)

(72) Inventors: Edward Chiang, Tanjong Pagar (SG); Arjita Madan, Hyderabad (IN); Sumit Gwalani, Hyderabad (IN); Heman Khanna, Hyderabad (IN); Kishore Nandakumar, Holland Road (SG); Paridhi Rawat, Hyderabad (IN)

(73) Assignee: Google LLC, Mountain View, CA (US)

( * ) Notice: Subject to any disclaimer, the term of this patent is extended or adjusted under 35 U.S.C. 154(b) by 363 days.

(21) Appl. No.: 15/887,734

(22) Filed: Feb. 2, 2018

(65) Prior Publication Data
US 2018/0294905 A1    Oct. 11, 2018

Related U.S. Application Data

(60) Provisional application No. 62/483,829, filed on Apr. 10, 2017.

(51) Int. Cl.
*H04H 20/93*    (2008.01)
*H04B 11/00*    (2006.01)
(Continued)

(52) U.S. Cl.
CPC .......... *H04H 20/93* (2013.01); *G10L 19/018* (2013.01); *H04B 11/00* (2013.01); *H04H 20/61* (2013.01);
(Continued)

(58) Field of Classification Search
CPC ........ H04H 20/93; H04H 60/64; H04H 20/61; H04H 2201/50; H04B 11/00; G10L 19/018; G06F 3/0482
See application file for complete search history.

(56) References Cited

U.S. PATENT DOCUMENTS

| | | |
|---|---|---|
| 2010/0223120 A1 | 9/2010 | Dragt |
| 2010/0223145 A1 | 9/2010 | Dragt |
| 2012/0045994 A1 | 2/2012 | Koh et al. |
| 2012/0130888 A1 | 5/2012 | Cooke et al. |

(Continued)

FOREIGN PATENT DOCUMENTS

| | | |
|---|---|---|
| EP | 2725536 | 4/2014 |
| JP | 2005-032118 | 2/2005 |

(Continued)

OTHER PUBLICATIONS

Viegas Da Cruz, "International Search Report and Written Opinion issued in International Application No. PCT/US2018/016706", dated May 17, 2018, 11 pages.

(Continued)

*Primary Examiner* — Daniel Pihulic
(74) *Attorney, Agent, or Firm* — Dority & Manning, P.A.

(57) ABSTRACT

An information system generates data, generates an audio token, associates the audio token with the data, and transmits the audio token along with the data to the account management system. The information system configures a broadcasting computing device to broadcast the audio token at a location. User computing devices at the location via an audio communication channel receive the broadcast token and retransmit the audio token to the account management system via a network. The account management system receives the audio token from a particular user computing device along with a request for data associated with the audio token, extracts the data associated with the audio token data, and transmits the data associated with the audio token to the particular user computing device.

20 Claims, 6 Drawing Sheets

(51) Int. Cl.
*G10L 19/018* (2013.01)
*H04H 20/61* (2008.01)
*H04H 60/64* (2008.01)
*G06F 3/0482* (2013.01)

(52) U.S. Cl.
CPC .......... *H04H 60/64* (2013.01); *G06F 3/0482* (2013.01); *H04H 2201/50* (2013.01)

(56) References Cited

U.S. PATENT DOCUMENTS

| | | | |
|---|---|---|---|
| 2012/0150903 | A1 | 6/2012 | Davis et al. |
| 2013/0185214 | A1 | 7/2013 | Azen et al. |
| 2014/0304068 | A1 | 10/2014 | Weinblatt et al. |
| 2018/0053176 | A1* | 2/2018 | Rawat .................. G06Q 20/204 |
| 2018/0293571 | A1* | 10/2018 | Chiang .................. G06Q 30/06 |
| 2018/0294905 | A1* | 10/2018 | Chiang .................. H04H 20/93 |

FOREIGN PATENT DOCUMENTS

| | | |
|---|---|---|
| JP | 2015-049525 | 3/2015 |
| JP | 2015-153107 | 8/2015 |
| JP | 2016-001886 | 7/2016 |
| WO | WO 2013/106159 | 7/2013 |
| WO | WO 2014/083709 | 6/2014 |
| WO | WO 2016/100982 | 6/2016 |
| WO | WO 2018/035419 | 2/2018 |
| WO | 2018/190938 A1 | 10/2018 |
| WO | WO-2018190938 A1 * 10/2018 | ............. H04H 20/61 |
| WO | WO-2019036092 A1 * 2/2019 | ........... G10K 11/175 |
| WO | WO-2019040152 A1 * 2/2019 | ............. H04B 11/00 |
| WO | WO-2019050590 A1 * 3/2019 | ............. H04B 11/00 |

OTHER PUBLICATIONS

Tang "International Preliminary Report on Patentability Opinion issued in International Application No. PCT/US2018/016706", dated Oct. 24, 2019, 7 pages.

International Preliminary Report on Patentability for PCT/US2017/047526, dated Feb. 19, 2019, 7 pages.

International Search Report and Written Opinion for PCT/US/2017/047526, dated Oct. 27, 2017, 13 pages.

* cited by examiner

MOBILE SERVICE REQUESTS TO ANY SOUND EMITTING DEVICE

CROSS-REFERENCE TO RELATED APPLICATIONS

This application claims priority to U.S. Provisional Patent Application No. 62/483,829 filed Apr. 10, 2017. The entire disclosure of the above-identified priority application is hereby fully incorporated herein by reference.

TECHNICAL FIELD

The present disclosure relates to transmitting information over audio communication channels, and particularly to transmitting information via audio communication channels via sound emitting devices.

BACKGROUND

Broadcasting computing devices having speakers that emit data via audio communication channels, including television signs, radios, and even city infrastructure, are located at a variety of important locations including subway stops, bus stops, and other points of interest. Generally, at points of interest, users may desire to perform an action such as viewing other information via user computing devices. For example, at a subway stop or a bus stop, a user may desire to conduct a service request. With current technology, communication of relevant information such as information that enables a user to conduct a service request using a user computing device for an item relevant to the point of interest, information concerning the point of interest, public service information, or other relevant information is limited to communication by employees to users or user access of websites. Accordingly, there is a need to enable and use broadcasting computing devices to communicate relevant information to user computing devices via audio communication channels.

SUMMARY

The examples described herein provide computer-implemented techniques for receiving, by a user computing device, data associated with an audio token transmitted by an advertising computing device. In an example, an information system configures an audio token comprising data with an account management computing system. The information system generates an audio token, associates the audio token with a digital component, and transmits the audio token along with the digital component to the account management computing system via the network. In an example, the audio token comprises a random number comprising an alphanumeric and/or symbolic string of characters and the information system generates the audio token via a random number generator. The information system configures a broadcasting computing device to broadcast the audio token at a location. In an example, the broadcasting computing device broadcasts the audio token at a location such that user computing devices comprising an application receive the broadcast token and retransmit the audio token to the account management computing system via a network to initiate a service request associated with the location.

An account management computing system receives the audio token from a particular user computing device over the network. For example, a user computing device receives the audio token transmitted at the location of the broadcasting computing device and then retransmits the audio token to the account management computing system via the network. For example, the application activates a microphone component of the user computing device to listen for data transmitted over audio communication channels, receives the broadcast audio token, and transmits the received audio token to the account management computing system via the network along with a request for a digital component associated with the audio token. The account management computing system receives the retransmitted audio token and the request for the digital component associated with the audio token. The account management computing system determines that the received audio token matches a stored audio token previously configured by a service system, extracts the digital component associated with the audio token data, and transmits the digital component associated with the audio token to the user computing device.

DETAILED DESCRIPTION OF THE EXAMPLES

Overview

Figure 1:
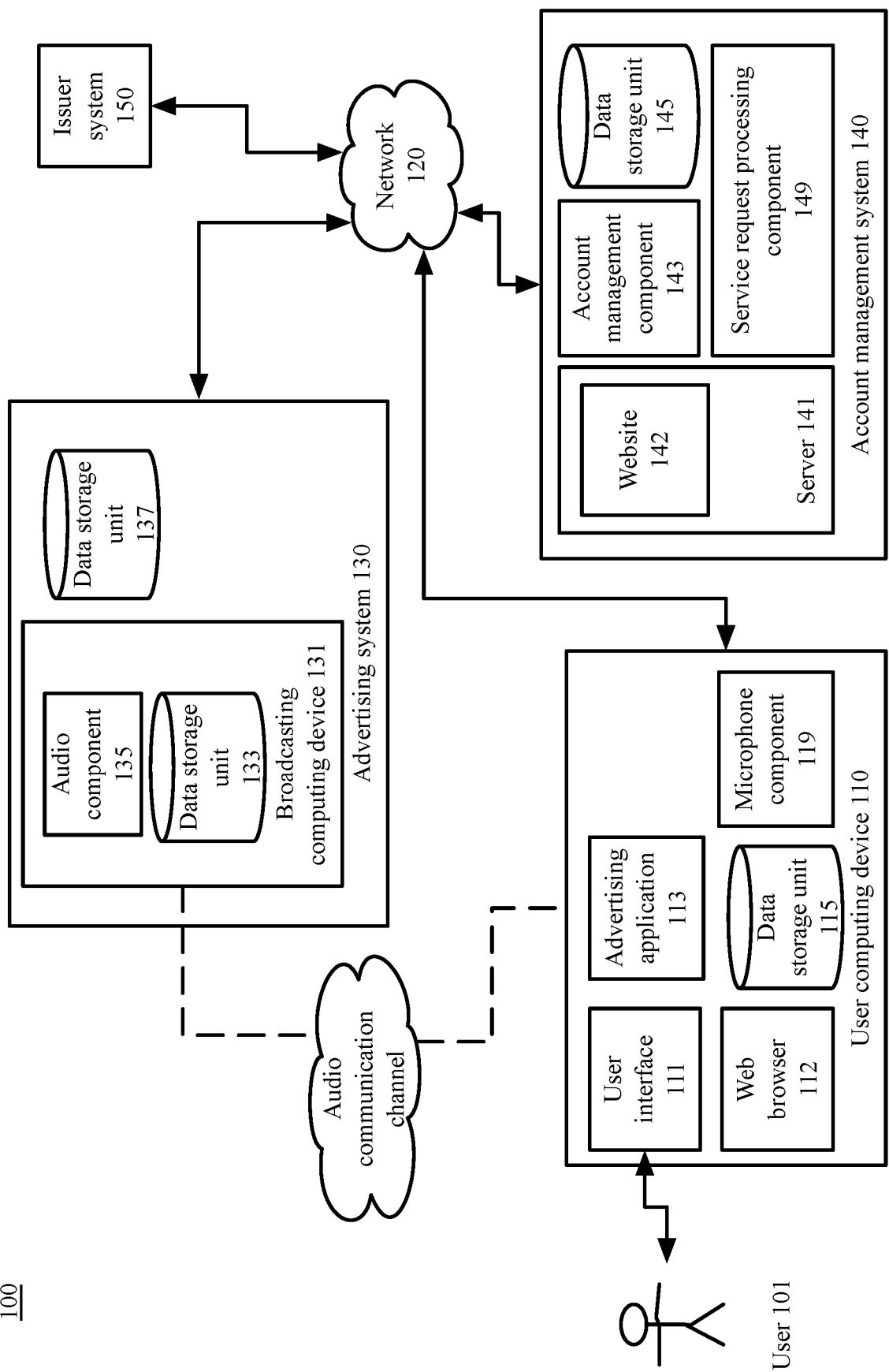
FIG. 1 is a block diagram depicting a system for receiving, by a user computing device and from an account management computing system, data associated with an audio token received from a broadcasting computing device to initiate a service request, in accordance with certain examples.

The example embodiments described herein provide computer-implemented techniques for receiving, by a user computing device, data associated with an audio token transmitted by an broadcasting computing device. Provided are a method, a computer program product, and a system according to the independent claims. Further developments are defined in the dependent claims.

In an example, an information computing system configures an audio token comprising data with an account management computing system. For example, the information system transmits data to the account management computing system and a request for an audio token via a network. Example data comprises a digital component, service request details, public service information, a uniform resource locator ("URL") for a website, or other relevant information to be broadcast by a broadcasting computing device at a location or point of interest. Example service request details comprise an identification of an item associated with a service request and account information associated with the account management computing system. In some examples, the account management computing system receives the data and the request for the audio token. In some examples, the account management computing system stores the received data, generates an audio token, and associates the generated token with the stored data. In some examples, the account management computing system transmits the generated audio token to the information system via a network. The information computing system receives the generated audio token via the network.

In other examples, the information computing system generates an audio token, associates the audio token with data, and transmits the audio token along with the data to the account management computing system via the network. In an example, the information computing system stores the audio token and the associated data in an audio token list maintained in a data storage unit accessible to the information computing system that associates generated audio tokens with data associated with each audio token generated by the information computing system. In these examples, the account management computing system receives the audio token and the data, associates the audio token with the data, and stores the audio token and the data. In an example, the account management computing system stores the audio token and the associated data in an audio token list maintained in a data storage unit accessible to the account management computing system, where the audio token list comprises a list that associates received audio tokens with received data associated with each received audio token.

In some examples, the information computing system configures a broadcasting computing device to broadcast the audio token at a location. In an example, the broadcasting computing device broadcasts the audio token at a location such that user computing devices comprising an application receive the broadcast token and retransmit the audio token to the account management computing system via a network to initiate a service request for an item relevant to the location. In this example, the information computing system comprises a service computing system. The service computing system transmits service request data comprising account information associated with the service computing system, an identification of an item, and a total amount associated with each identified item to associate with the audio token data to the account management computing system.

In another example, the information computing system instructs the account management computing system to associate the audio token with a uniform resource locator ("URL") for a website. In certain examples, the information computing system or broadcast computing device operator configures the audio token and the information computing system or the broadcast computing device transmits the configured audio token along with associated data (such as a URL or service request information) to the account management computing system to associate the audio token with the transmitted data. In other examples, the information computing system transmits the data comprising a URL, service request data, or other data, together with a request, for an audio token from the account management computing system via a network. In these other examples, the account management computing system receives the data, generates an audio token, associates the data received from the information computing system or broadcasting computing device with the audio token, and transmits the audio token to the broadcasting computing device or information computing system so that the broadcasting computing device broadcasts the audio token.

In an example, an account management computing system receives the audio token from a particular user computing device over the network. In this example, the particular user computing device received the audio token transmitted at the location of the broadcasting computing device and then transmitted the audio token to the account management computing system via the network. In some examples, the application on the user computing device communicates with the account management computing system via a network when the user is signed in to the application. In some examples, the application activates a microphone component of the user computing device to listen for data transmitted over audio communication channels. In some examples, the user computing device receives, via the microphone component, the audio token broadcasted by the broadcasting computing device. In some examples, the advertising application transmits the received audio token to the account management computing system via the network along with a request for data associated with the audio token. In some examples, the account management computing system receives the retransmitted audio token and the request for data associated with the audio token.

In some examples, the account management computing system determines that the received audio token matches a stored audio token previously configured by an information computing system, and extracts the advertising data associated with the audio token data. In an example, the advertising data comprises service request data. The service request data comprises service computing system account information and a total amount. In an example, the account management computing system communicates with the user computing device to receive a confirmation to initiate a service request and to receive user account data. The account management computing system processes a service request using the user account data and the service computing system account data by communicating with a third party computing system. The account management computing system transmits information to the user computing device and/or the service computing system indicating whether the service request was successfully processed.

In other examples, the account management computing system receives an audio token broadcasted by a broadcasting computing device and retransmitted by a user computing device, and extracts data associated with the audio token comprising data. Example data extracted comprises a URL. In this example, the account management computing system transmits the URL to the user computing device over the network along with instructions to the user computing device to access a website associated with the URL. In another example, the account management computing system receives an audio token and extracts data associated with an application associated with the information computing system and provided by an application store managed by the account management computing system. In this example, the account management computing system transmits a request to the user computing device. In an example, the user computing device receives a request to download the application and displays the request to download the application via a user interface of the user computing device. In some examples, the user selects an option on the user computing device to download the application and the user computing device receives the application over the network from the account management computing system.

In another example, the account management computing system receives an audio token broadcast by a broadcasting computing device and retransmitted by a user computing device, and extracts data associated with the audio token. An example audio token comprises public service data. For example, public service data comprises an alert issued by a public service or other service such as a traffic alert, emergency alert, or weather alert. For example, the information computing system comprises a public service computing system. In this example, the account management computing system transmits the alert information to the user computing device associated with the audio token.

By using and relying on the methods and systems described herein, for example, the information computing system, the user computing device, and the account management computing system provide the capability to transmit data to user computing devices via audio communication channels at points of interest comprising an audio broadcasting computing device. As such, the systems and methods described herein enables transmitting an indication of data via audio communication channels to user computing devices at appropriate locations. By using and relying on the methods and systems described herein, for example, the information computing system, the user computing device, and the account management computing system enable a user to receive relevant information at points of interest directly on a user computing device at the point of interest without having to request information from employees or provide inputs on the user computing device to search for and access web sites to receive information. As such, the methods and systems described herein reduce inputs required by users with respect to user computing devices to receive relevant information at points of interest. Further, by using and relying on the methods and systems described herein, the information computing system, the user computing device, and the account management computing system enable the information computing system to increase locations at which data may be transmitted by enabling transmission via any sound-emitting broadcasting device and reduce the cost of transmitting data by only having to transmit an audio token associated with data that may be exchanged by the user computing device with the account management computing system for the associated data.

Example System Architecture

Turning now to the drawings, in which like numerals indicate like (but not necessarily identical) elements throughout the figures, examples are described in detail.

FIG. 1 is a block diagram depicting a system 100 for transmitting, by a broadcasting computing device, an audio token associated with data that a user computing device requests from an account management computing system, in accordance with certain examples. As depicted in FIG. 1, the system 100 comprises network computing devices 110, 130, 140, and 150 that are configured to communicate with one another via one or more networks 120. In some embodiments, a user associated with a device must install an application and/or make a feature selection to obtain the benefits of the techniques described herein.

In examples, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy ("BLE"), near field communication ("NFC"), ultrasound communication, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, 140, and 150 includes a device having a communication module capable of transmitting and receiving data over the network 120. For example, each network computing device 110, 130, 140, and 150 can include a server, desktop computer, laptop computer, tablet computer, a television with one or more processors embedded therein and/or coupled thereto, smart phone, handheld computer, personal digital assistant ("PDA"), video game device, wearable computing device, or any other wired or wireless, processor-driven device. In the example depicted in FIG. 1, the network computing devices 110, 130, 140, and 150 are operated by users 101, advertising computing system operators, account management computing system 140 operators, and issuer computing system 150 operators, respectively.

An example user computing device 110 comprises a user interface 111, an advertising application 113, a data storage unit 115, and a microphone component 119. The user computing device 110 communicates with an account management computing system 140 via the network 120 and receives data over an audio communication channel from the broadcasting computing device 131 associated with the advertising computing system 130.

In an example, the user interface 111 enables the user 101 to interact with the user computing device 110. For example, the user interface 111 comprises a touch screen, a voice-based interface, or any other interface that allows the user 101 to provide input and receive output from an application on the user computing device 110. In an example, the user 101 interacts via the user interface 111 with the payment application 113.

In an example, the advertising application 113 is a program, function, routine, applet, or similar entity that exists on and performs its operations on the user computing device 110. In certain examples, the user 101 must install the advertising application 113 and/or make a feature selection on the user computing device 110 to obtain the benefits of the techniques described herein. In an example, the user 101 accesses the advertising application 113 on the user computing device 110 via the user interface 111. In an example, the advertising application 113 is associated with the account management computing system 140. In an example, the advertising application 113 comprises a payment application and the account management computing system 140 comprises an account management computing system. In another example, the advertising application 113 comprises a ticketing application and the account management computing system 140 comprises an account management computing system. In yet another example, the advertising computing system 113 comprises an email application, a mapping application, a shopping application, a social media application, or other application.

In an example, the data storage unit 115 comprises a local or remote data storage structure accessible to the user computing device 110 suitable for storing information. In an example, the data storage unit 115 stores encrypted information, such as HTML5 local storage.

In an example, the microphone component 119 comprises a microphone device that is capable of receiving ultrasound inputs and audible sound inputs from an environment of the user computing device 110. In an example, the microphone component 119 communicates with the advertising application 113 to receive an instruction to transition from a passive mode to an active mode and listen for ultrasound inputs. In an example, the microphone component 119 receives ultrasound inputs while in the active mode and transmits the received ultrasound inputs to the payment application 113.

An example advertising computing system 130 comprises one or more broadcasting computing devices 130 located at advertising locations. An example broadcasting computing device 130 comprises a data storage unit 133 and an audio component 135. In example, the broadcasting computing device comprises a radio, a computer, a television, or other device comprising an audio component 135 capable of broadcasting audio tokens over an audio communication channel. In another example, the broadcasting computing device 131 comprises a mobile computing device such as a smartphone device, tablet device, or other mobile computing device. In another example, the broadcasting computing device 131 comprises a point of sale terminal. The advertising computing system 130 communicates with an account management computing system 140 via the network 120. The broadcasting computing device 131 communicates data to the user computing device 110 via an audio communication channel.

In an example, the data storage unit 133 comprises a local or remote data storage structure accessible to the broadcasting computing device 131 suitable for storing information. In an example, the data storage unit 133 stores encrypted information, such as HTML5 local storage.

In an example, the audio component 135 comprises a speaker device or other device capable of producing an ultrasound or audible sound output. In an example, the audio component 135 can be configured by the advertising computing system 130 to broadcast an audio token at a location of the broadcasting computing device 131. In an example, the audio component 135 is a component of another device that is communicatively coupled to the broadcasting computing device 131 or to the advertising computing system 130.

An example account management computing system 140, or service processing system, comprises a server 141, a website 142, an account management component 143, a data storage unit 145, and a service request processing component 149. In an example, the account management computing system 140 communicates with the user computing device 110 and the advertising computing system 130 via the network 120. In an example, the account management computing system 140 communicates with an issuer computing system 150 via the network 120.

In an example, the server 141 provides the content that the user 101 accesses through the web browser on the user computing device 110, including but not limited to html documents, images, style sheets, and scripts. In an example, the web server 141 supports the website 143 of the account management computing system 140.

In an example, the website 142 communicates with the web browser 118 or advertising application 113 resident on the user computing device 110 via the network 120. In an example, the user 101 accesses the website 143 to download an advertising application 113 and/or configure a user 101 account with the account management computing system 140.

In an example, the account management component 143 manages user 101 accounts and merchant system accounts associated with users 101 and merchant systems, respectively. The account management component 143 receives requests to add, edit, delete, or otherwise modify payment account information for a user 101 account or a merchant system account.

In an example, the data storage unit 145 comprises a local or remote data storage structure accessible to the account management computing system 140 suitable for storing information. In an example, the data storage unit 145 stores encrypted information, such as HTML5 local storage.

In an example, the service request processing component 149 receives service request details from an advertising computing system 130 and an audio token from a user computing device 110. In an example, the service request processing component 149 extracts stored transaction details received from the advertising computing system 130 and associated with the received audio token. For example, the service request details comprise a total amount of a service request and advertising computing system 130 account information. The service request processing system component 149, in an example, extracts account information associated with a user 101 account associated with the user computing device and transmits a service authorization request to an issuer computing system 150 or other appropriate institution associated with the user 101 payment account information. An example service authorization request comprises advertising computing system account information, user 101 account information, and a total amount of the service request. In an example, after the issuer computing system 150 processes the service authorization request, the service request processing component 149 receives an approval or denial of the service authorization request from the issuer computing system 150 over the network 120. In an example, the service request processing component 149 transmits a receipt to the merchant computing device, the advertising computing system 130, and/or the user computing device 110 comprising a summary of the payment transaction.

In another example, the service request processing component 149 receives an audio token from the user computing device 110, extracts data associated with the audio token, and transmits the extracted data to the user computing device 110. For example, the data comprises images, text, a URL, or other data associated with the received audio token. In this example, the service request processing component 149 of the account management computing system 140 received the data to associate with the token from the advertising computing system 130.

An example issuer computing system 150 approves or denies a service authorization request received from the merchant computing system or from the account management computing system 140. In an example, the issuer computing system 150 communicates with the merchant computing device, the advertising computing system 130, and/or account management computing system 140 over the network 120. In an example, the issuer computing system 150 communicates with an acquirer system to approve a credit authorization and to make payment to the account management computing system 140 and/or merchant system. For example, the acquirer system is a third party payment processing company.

Figure 6:
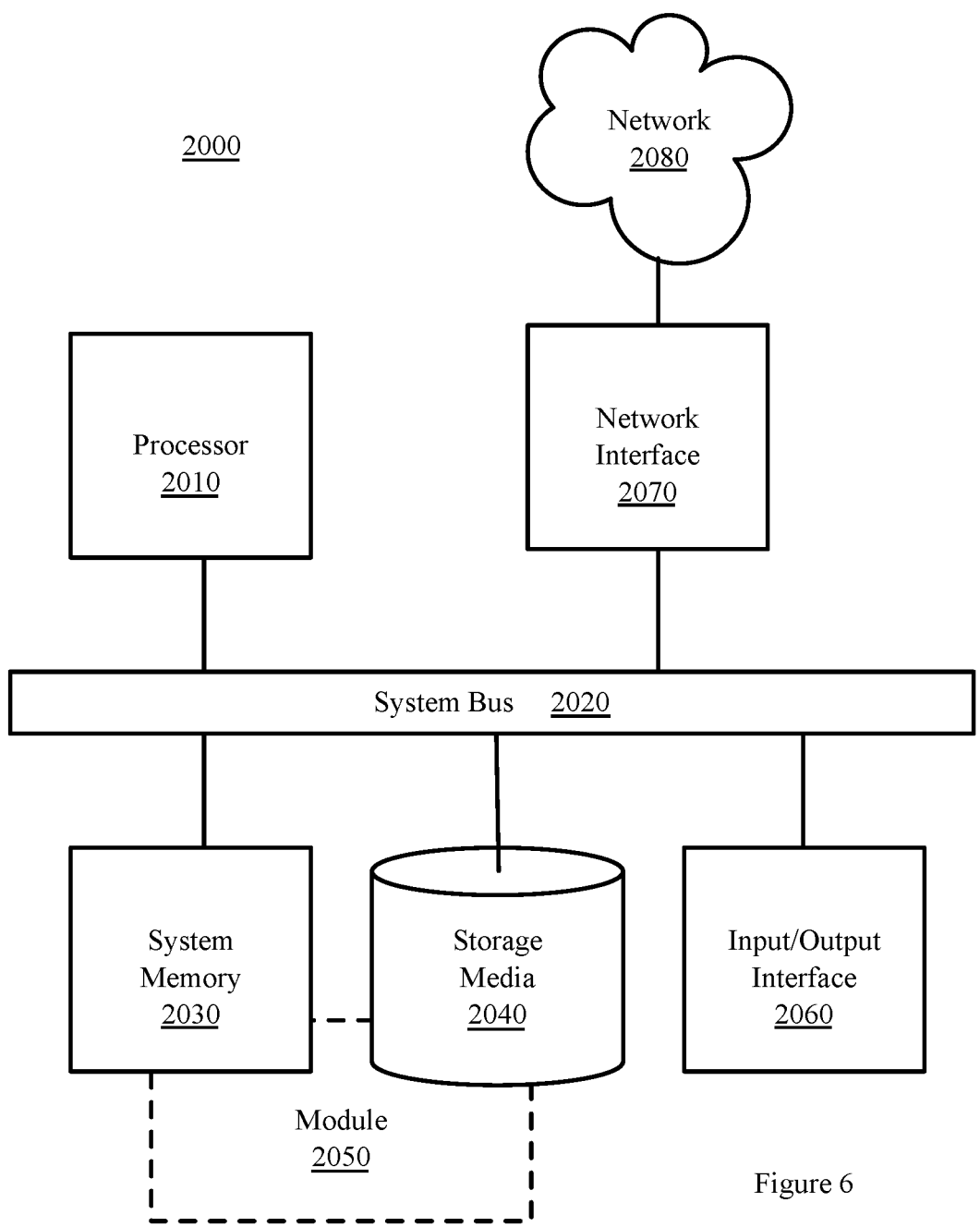
FIG. 6 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 6. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 6. The computing machines discussed herein may communicate with one another, as well as with other computing machines or communication systems over one or more networks, such as network 120. The network 120 may include any type of data or communications network, including any of the network technology discussed with respect to FIG. 6.

Example Processes

The example methods illustrated in FIGS. 2-5 are described hereinafter with respect to the components of the example operating environment 100. The example methods of FIGS. 2-5 may also be performed with other systems and in other environments. The operations described with respect to any of the FIGS. 2-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
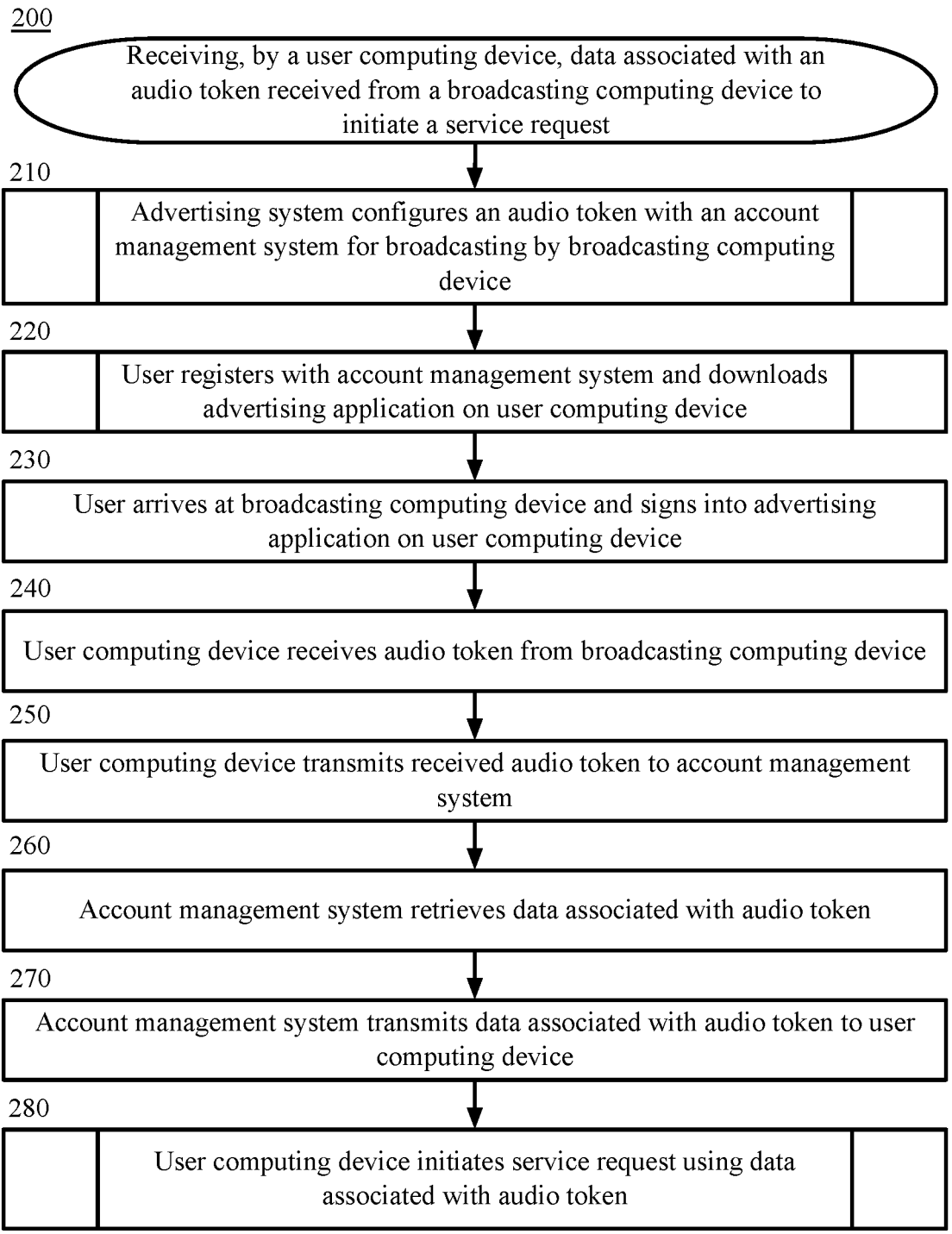
FIG. 2 is a block diagram depicting a method for receiving, by a user computing device and from an account management computing system, data associated with an audio token received from a broadcasting computing device to initiate a service request, in accordance with certain examples.

FIG. 2 is a block diagram depicting a method 200 for receiving, by a user computing device, data associated with an audio token from a broadcasting computing device to initiate a service request, in accordance with certain examples. The method 200 is described with reference to the components illustrated in FIG. 1.

In block 210, an advertising computing system 130 configures an audio token with an account management computing system 140 for broadcasting by a broadcasting computing device 131. The method for configuring, by an advertising computing system 130, an audio token with an account management computing system 140 for broadcasting by a broadcasting computing device 110 is described in more detail hereinafter with reference to the method described in FIG. 3. An example audio token comprises a string of data that is transmitted by the broadcasting computing device 110 via audio communication channels and received by one or more user computing devices 131. For example, the string of data may comprise an audio token identifier comprising a series of alphanumeric and/or symbolic characters.

Figure 3:
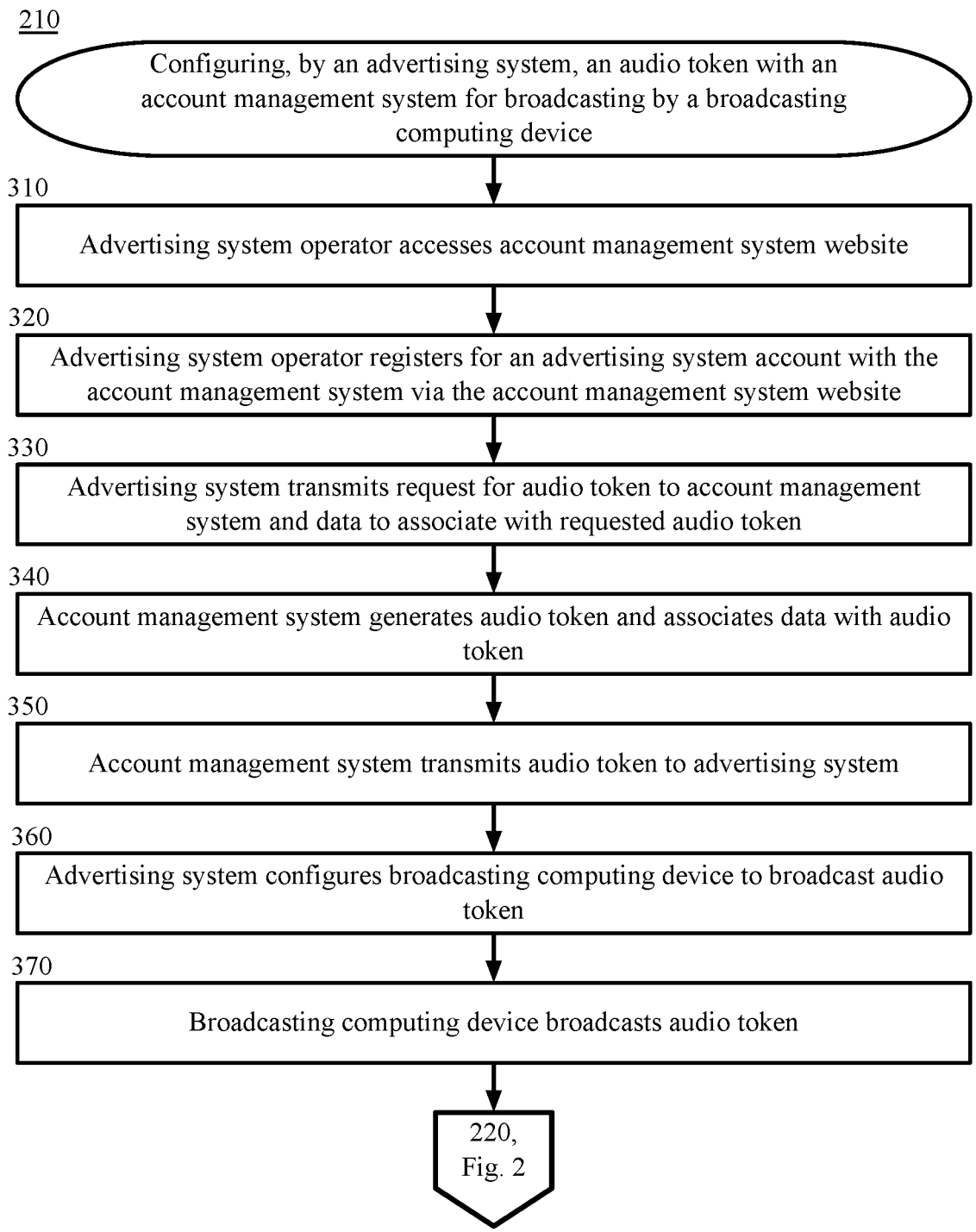
FIG. 3 is a block diagram depicting a method for configuring, by an advertising computing system, an audio token with an account management computing system for broadcasting by a broadcasting computing device, in accordance with certain examples.

FIG. 3 is a block diagram depicting a method 210 for configuring, by an advertising computing system 130, an audio token with an account management computing system 140 for broadcasting by a broadcasting computing device 110, in accordance with certain examples. The method 210 is described with reference to the components illustrated in FIG. 1. For example, an advertising computing system 130 configures an audio token by generating an audio token identifier and then associating data with the audio token identifier. In another example, the advertising computing system 130 transmits data to associate with an audio token and transmits the data to the account management system 130 along with a request for an audio token. In this other example, the account management system 130 receives the data and the request and generates an audio token identifier and associates the received data with the audio token identifier.

In block 310, an advertising computing system 130 operator accesses an account management computing system website 142. For example, the advertising computing system 130 operator accesses the website 142 via an advertising computing system computing device (not depicted).

In block 320, the advertising computing system 130 operator registers for an advertising computing system 130 account with the account management computing system 140 via the account management computing system website 142. For example, the advertising computing system 130 operator registers for an account via the advertising computing system 130 computing device (not depicted) and provides advertising computing system 130 account information to set up an advertising computing system 130 account with the account management computing system 140. Example account information may comprise an advertising computing system 130 name, an advertising computing system 130 location, and payment account information associated with the advertising computing system 130. In another example, the advertising computing system 130 operator accesses an existing advertising computing system 130 account via the advertising computing system 130 computing device and logs into the advertising computing system 130 account.

In block 330, the advertising computing system 130 transmits a request for an audio token to the account management computing system 140 and data to associate with the requested audio token. For example, the advertising computing system 130 transmits advertising data to the account management computing system 140 and a request for an audio token via a network 120. For example, example advertising data comprises an advertisement, transaction details, public service information, a uniform resource locator ("URL") for a website, or other relevant information to be broadcast by a broadcasting computing device 110 at a point of interest. Example transaction details comprise an identification of an item to be purchased, a total amount of a transaction, and payment account information associated with the account management computing system 140. In an example, the account management system 140 receives the advertising data via the network 120 and associates the received advertising data with an audio token that will later be broadcast at the point of interest by an audio broadcasting computing device 131. In this example, the account management system 140 receives, via the network 120, the audio token from user computing devices 110 at the point of interest that receive the audio token broadcast at the point of interest by the audio broadcasting computing device 131. In this example, the account management system 140 enables reception of relevant advertising data at a point of interest for user computing devices 110 in audio range of an audio broadcasting computing device 131 at the point of interest that is transmitting the audio token.

In block 340, the account management computing system 140 generates an audio token and associates data with the audio token. In an example, the account management computing system 140 receives, via the network 120, the advertising data and the request to generate an audio token. In an example, the account management computing system 140 identifies an advertising system 130 account associated with the advertising system 130 that sent the request for the audio token. In some examples, the account management computing system 140 stores the received advertising data, generates an audio token, and associates the generated token with the stored advertising data and an advertising system 130 account identifier associated with the advertising system 130 account. In an example, the audio token comprises a random number comprising an alphanumeric and/or symbolic string of characters and the account management computing system 140 generates the audio token via a random number generator. In an example, the account management computing system 140 stores the audio token and the associated advertising data in an audio token list maintained in a data storage unit accessible to the account management computing system 140, where the audio token list comprises a list that associates generated audio tokens with advertising data associated with each generated audio token. In this example, the account management system 140 associates the data received from the advertising system 130 with the advertising system 130 account identifier associated with the advertising system 130 account and with the generated audio token in the list.

In some examples, the account management computing system 140 transmits the generated audio token to the advertising computing system 130 via the network 120. The advertising computing system 130 receives the generated audio token via the network 120.

In block 350, the account management computing system 140 transmits the audio token to the advertising computing system 130. For example, the account management computing system 140 transmits the generated audio token to the advertising computing system 130 via the network 120.

In other examples, the advertising computing system 130 generates an audio token, associates the audio token with advertising data, and transmits the audio token along with the advertising data to the account management computing system 140 via the network 120. In an example, the audio token comprises a random number comprising an alphanumeric and/or symbolic string of characters and the advertising generates the audio token via a random number generator. In an example, the advertising computing system 130 stores the audio token and the associated advertising data in an audio token list maintained in a data storage unit 137 accessible to the advertising computing system 130 that associates generated audio tokens with advertising data associated with each audio token generated by the advertising computing system 130. In these examples, the account management computing system 140 receives the audio token and the advertising data via the network 120, identifies an advertising computing system 130 account identifier associated with the advertising computing system 130, associates the audio token with the advertising data and the advertising computing system 130 account identifier, and stores the audio token and the advertising data. In an example, the advertising computing system maintains a list of audio tokens with associated stored advertising data. In an example, the account management computing system 140 stores the audio token and the associated advertising data in an audio token list maintained in a data storage unit 145 accessible to the account management computing system 140, where the audio token list comprises a list that associates received audio tokens with received advertising data associated with each received audio token.

In an example, the advertising computing system 130 comprises a merchant computing system. The merchant system configures an audio token by transmitting transaction data comprising payment account information associated with the merchant system, an identification of an item for purchase, and a total amount of transaction associated with each identified item for purchase to associate with the audio token data to the account management computing system 140. For example, the identified item for purchase comprises a ticket for admission to a zoo. In another example, the merchant system transmits transaction data comprising payment account information associated with the merchant system and two or more selectable items associated with respective total amounts of transaction associated with each selectable item to associate with the audio token data to the account management computing system. For example, the selectable items associated with respective total amounts of transaction comprise an adult ticket selectable item associated with a respective total amount of transaction of 15 dollars, a child ticket selectable item associated with a respective total amount of transaction of 8 dollars, and a student discount ticket selectable item associated with a respective total amount of transaction of 12 dollars.

In another example, the advertising computing system 130 instructs the account management computing system to associate the audio token with a uniform resource locator ("URL") for a website. In certain examples, the advertising computing system or broadcast device operator configures the audio token and transmit the configured audio token along with associated data (such as a URL or transaction information) to the account management computing system to associate the audio token with the transmitted data. In other examples, the advertising computing system transmits the data comprising a URL, transaction data, or other data, together with a request, for an audio token from the account management computing system via a network. In these other examples, the account management computing system 140 receives the data, generates an audio token, associates the data received from the merchant system or broadcasting computing device with the audio token, and transmits the audio token to the broadcasting computing device or merchant system so that the broadcasting computing device broadcasts the audio token. In these other examples, the user computing device 110 receives the audio token broadcast by the broadcasting computing device 130 via an audio communication channel, transmits the received audio token to the account management computing system via the network 120, and receives the data via the network 120 from the account management computing system 140 that corresponds to the audio token.

In block 360, the advertising computing system 130 configures the broadcasting computing device 131 to broadcast the audio token. For example, the advertising computing system 130 configures the broadcasting computing device 131 to broadcast the audio token via one or more audible communication channels. In another example, the advertising computing system 130 configures the broadcasting computing device 131 to broadcast the audio token via one or more ultrasound communication channels. In an example, the broadcasting computing device 131 comprises an audio component 135, for example, a speaker component, that broadcasts the audio token that the broadcasting computing device 131 is configured to broadcast. In certain examples, the broadcasting computing device 131 does not communicate over the network 120. In certain other examples, the broadcasting computing device 131 communicates with the advertising computing system 130 and/or the account management computing system 140 via the network 120 and the advertising computing system 130 or the account management computing system 140 transmits an instruction to the broadcasting computing device 131 via the network 120 to broadcast the audio token. In these examples, the broadcasting computing device 131 receives the instruction to transmit the audio token via the network 120.

In block 370, the broadcasting computing device 131 broadcasts the audio token. For example, the broadcasting computing device 131 broadcasts the audio token at the location of the broadcasting computing device 131 via the audio component 135. In an example, an advertising computing system 130 operator configured the broadcasting computing device 131 to broadcast the audio token. In another example, the broadcasting computing device 131 receives, via the network 120, an instruction from the advertising computing system 130 or the account management computing system to broadcast the audio token and activates the audio component 135 to broadcast the audio token in response to receiving the instruction to broadcast the audio token so that user computing devices 110 in a specified proximity to the broadcasting computing device 131 may receive the broadcast audio token via audio communication channels and transmit the received audio token to the account management computing system 140. In an example, the broadcasting computing device 131 is configured to continuously broadcasts the audio token. In another example, the broadcasting computing device 131 is configured to periodically broadcast the audio token at predefined intervals, for example, broadcast every five minutes for a two minute duration. In yet another example, the broadcasting computing device 131 is configured to broadcast the audio token at predefined times over a predefined time period, for example, each day between 6:00-10:00 a.m. and 4:00-7:00 p.m.

From block 370, the method 210 proceeds to block 220 in FIG. 2.

Returning to FIG. 2, in block 220, the user 101 registers with the account management computing system 140 and downloads an advertising application 113 onto the user computing device 110. The method 220 for registering, by a user 101, for an account with an account management computing system 140 and downloading an advertising application 113 onto a user computing device 110 is described in more detail hereinafter with reference to the method described in FIG. 4.

Figure 4:
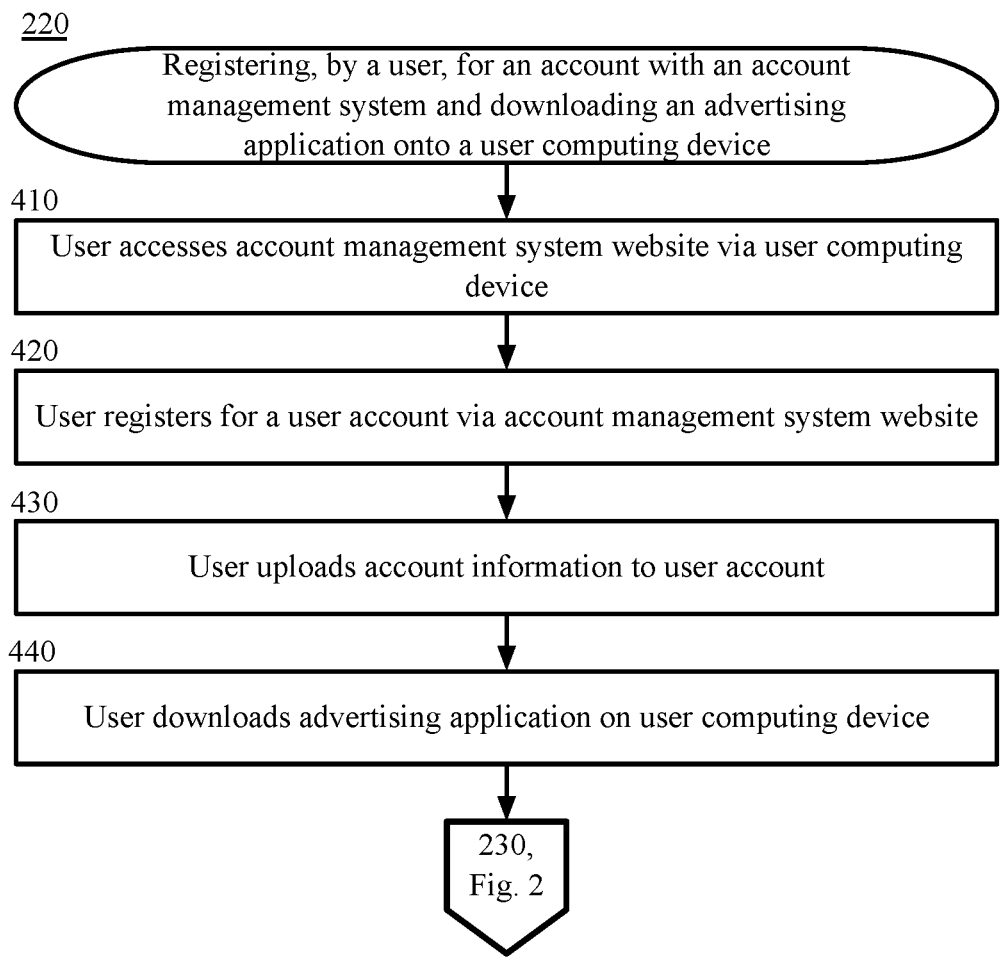
FIG. 4 is a block diagram depicting a method for registering, by a user, for an account with an account management computing system and downloading an advertising application onto a user computing device, in accordance with certain examples.

FIG. 4 is a block diagram depicting a method 220 for registering, by a user 101, for an account with an account management computing system 140 and downloading an advertising application 113 onto a user computing device 110, in accordance with certain examples. The method 220 is described with reference to the components illustrated in FIG. 1.

In block 410, the user 101 accesses the account management computing system website 143 via the user computing device 110. In an example, the user 101 enters the website 143 address into a web browser 112 of the user computing device 110 or otherwise accesses the web site 143 via the user interface 111 of the user computing device 110. In an example, the user 101 actuates a user interface 111 object on an advertisement on the web browser 112 and the web browser 112 redirects to the web site 143.

In block 420, the user 101 registers for a user 101 account via the account management computing system website 143. The user 101 may obtain a user 101 account number, receive the appropriate applications and software to install on user computing device 110, request authorization to participate transaction processing, or perform any action required by the account management computing system 140. The user 101 may utilize the functions of the user computing device 110, such as the user interface 111 and a web browser, to register and configure a user 101 account. In an example, the user 101 may enter payment account information associated with one or more user 101 accounts, for example, one or more credit accounts, one or more bank accounts, one or more stored value accounts, and/or other appropriate accounts into the user 101 account maintained by the account management computing system 140.

In block 430, the user 101 uploads user 101 payment account information to the user 101 account. In an example, the user 101 may configure user 101 account settings or add, delete, or edit payment account information via the payment processing system website 143. In an example, the user 101 may select an option to enable or disable the permission of the payment processing system 140 to process transactions. For example, the payment account information comprises an account number, an expiration date, an address, a user 101 account holder name, or other information associated with the user 101 payment account that would enable the account management computing system 140 to process a payment transaction.

In block 440, the user 101 downloads the advertising application 113 on the user computing device 110. In an example, the user 101 selects an option on the account management computing system 140 website 143 to download an advertising application 113 onto the user computing device 110. In an example, the advertising application 113 operating on the user computing device 110 is able to communicate with the account management computing system 140 over the network 120. In an example, the advertising application 113 operating on the user computing device 110 is able to communicate with the account management computing system 140 over the network 120 when the user 101 is signed in to the advertising application 113.

From block 440, the method 220 proceeds to block 230 in FIG. 2.

Returning to FIG. 2, in block 230, the user 101 arrives at a location associated with the broadcasting computing device 131. In an example, the user 101 signs into the payment application 113 before arriving within a proximity to the broadcasting computing device 131. In another example, the user 101 signs in to the advertising application 113 at the same time or after the user 101 arrives within the proximity to the broadcasting computing device 131. For example, the proximity comprises a distance over which the user computing device 110 may receive audio tokens broadcast by the broadcasting computing device 131. In an example, to sign in to the advertising application 113, the user 101 may enter a username and password associated with the user's 101 payment account management computing system 140 account and select an object on the user interface 111 that reads "sign in." In this example, the advertising application 113 communicates the username and password to the account management computing system 140 via the network 120. In this example, the account management computing system 140 validates the username and password for the user 101 account. In this example, if the username and password are correct, the account management computing system 140 establishes communication with the advertising application 113 on the user computing device 110 via the network 120.

In block 240, the user computing device 110 receives the audio token from the broadcasting computing device 131. In an example, the broadcasting computing device 131 broadcasts the audio token at a location, such as a ticketing location or other point of interest, such that user computing devices 110 comprising an advertising application 113 receive the broadcast token and retransmit the audio token to the account management computing system 140 via the network 120 to initiate a payment transaction or service request for an item relevant to the location. In an example, when the user is signed in to the advertising application 113, the advertising application 113 activates a microphone component 119 of the user computing device 110, enabling the user computing device 110 to receive audio tokens transmitted by broadcasting computing devices 131 over audio communication channels. In an example, the user computing device 110 receives the audio token broadcast by the broadcasting computing device 131 over an audio communication channel via the microphone component 119.

For example, a configured audio token comprises an audio token identifier and broadcasting the audio token comprises broadcasting, via the broadcasting computing device 131, the audio token via one or more audio communication channels at the location. In this example, one or more user computing devices 110 are signed in to the advertising application 113 and receive the broadcast audio token at the location and transmit the received audio token to the account management computing system 140 via the network 120. In this example, the account management computing system 140 previously associated the audio token with data received from the advertising system 130.

In block 250, the user computing device 110 transmits the received audio token to the account management computing system 140. For example, the user computing device 110 transmits the received audio token to the account management computing system 140 via the network 120. For example, the user is signed in to the advertising application 113 and, when the user is signed in to the advertising application 113, the advertising application 113 communicates with the account management system 140 via the network 120. In this example, when the user is signed in to the advertising application 113, the advertising system 113 activates the microphone component 119 of the user computing device 119, enabling the user computing device 110 to receive audio tokens via one or more audio communication channels. In an example, the advertising application 113 translates the received audio token into a series of alphanumeric and/or symbolic characters. For example, the audio token comprises a sound input and the advertising application 113 interprets the received sound input by translating it into the series of alphanumeric and/or symbolic characters. In this example, the advertising application 113 transmits the translated audio token to the account management computing system 140 via the network 120. In other examples, the advertising application 113 does not translate the received audio token and instead records the received audio input and transmits, via the network 120, the recorded audio input to the account management computing system 140. In these other examples, the account management computing system 140 interprets the received audio token comprising the recorded audio input recorded by the user computing device 110 to a series of alphanumeric and/or symbolic characters.

In block 260, the account management computing system 140 retrieves the data associated with the audio token. For example, the account management computing system 140 determines that the received audio token matches a stored audio token previously configured by an advertising computing system 130, and extracts the advertising data associated with the audio token data. For example, the account management computing system 140 maintains a list in a data storage unit that lists the audio tokens and advertising data associated with each audio token. In an example, the account management computing system 140 lists each audio token according to audio token identifier, each audio token identifier comprising a series of alphanumeric and/or symbolic characters.

In an example, the account management computing system 140 receives, via the network 120 from the user computing device 110, the series of alphanumeric and/or symbolic characters comprising the audio token identifier that were translated from the audio token sound input received by the user computing device 110 from the broadcasting computing device 131. In this example, the account management computing system 140 determines that the series matches a series of alphanumeric and/or symbolic characters corresponding to an audio token identifier previously configured by the account management computing system 140 and associated with data received from the advertising computing system 130. In another example, the account management computing system 140 receives the audio input associated with the audio token received by the user computing device 110, translates the audio input into a series of alphanumeric and/or symbolic characters, and determines that the series matches a series of alphanumeric and/or symbolic characters corresponding to an audio token identifier previously configured by the account management computing system 140 and associated with data received from the advertising computing system 130

In an example, the advertising data comprises transaction data associated with an advertising computing system 130 comprising a merchant system. In this example, transaction data comprises merchant system payment account information and a total amount of transaction. In another example, the transaction data comprises payment account information associated with the merchant system and two or more selectable items associated with respective total amounts of transaction associated with each selectable item. For example, the merchant system comprises a transportation system. A first selectable item comprises a one-ride train pass with a total amount of transaction of $2.00. The second selectable item comprises a ten-ride train pass with a total amount of transaction of $18.00. The third selectable item comprises an unlimited-ride one-month train pass with a total amount of transaction of $40.00. In another example, the advertising data associated with the audio token comprises a uniform resource locator ("URL"). For example, the URL comprises a link to a merchant website.

In block 270, the account management computing system 140 transmits the data associated with the audio token to the user computing device 110. In an example, the account management computing system 140 transmits transaction details and a request, via the network 120 to the user computing device 110, for confirmation to initiate a transaction and to receive user payment account data. The user computing device 110 receives the request for confirmation via the network 120 and displays the request for confirmation via the user interface 111. In an example, the user computing device 110 further displays transaction details such as an indication of one or more items being purchased and a total amount of transaction (as determined from the advertising data associated with the audio token). The user computing device 110 receives a selection via the user interface 111 indicating a desire of the user to confirm initiation of the transaction. For example, the user selects an interface object on the user interface 111 that reads "confirm this transaction." In certain examples, the user computing device 110 displays two or more selectable items via the user interface 111 corresponding to two or more purchasable items in the advertising data and a selectable object enabling the user to indicate a desire to proceed with the transaction.

In this example, the user selects a first interface object corresponding to a particular selectable item and a second interface object on the user interface 111 that reads "confirm this transaction." In an example, the user computing device 110 transmits, via the network 120, a request to confirm the transaction and the selected selectable item (if applicable) to the account management system 140 in accordance with the received one or more selections of the user. The account management computing system 140 processes a transaction using the user payment account data and the merchant system payment account data by communicating with an issuer computing system 150 (for example, a bank, credit card network and/or issuer computing system, associated with the user payment account information). The account management computing system 140 transmits a receipt to the user computing device 110 and/or the merchant system indicating whether the transaction was successfully processed. An example receipt comprises transaction information such as the total amount of transaction, a description of one or more of the items purchased by the user of the user computing device 110, or other relevant or useful receipt information.

In other examples, the account management computing system 140 extracts data associated with the audio token comprising a uniform resource locator ("URL"). In this example, the account management computing system 14—transmits the URL to the user computing device 110 over the network 120 along with instructions to the user computing device 110 to access a website associated with the URL. In an example, the user computing device 110 receives, over the network 120, the instructions to access the website associate with the URL and accesses the website in accordance with the received instructions. In certain examples, the user accesses the website associated with the URL and purchases one or more items, registers for a user account with the website, signs up for alerts or email correspondence, or conducts some other action with respect to the website using the user computing device 110.

In another example, the account management computing system 140 extracts data associated with an application associated with the advertising computing system 130 and provided by an application store managed by the account management computing system 140. In this example, the account management computing system 140 transmits a request to the user computing device 110 providing the user associated with the user computing device 110 an option to download the application. In this example, user computing device 110 receives the request to download the application and displays the request to download the application via a user interface 111 of the user computing device 110. In some examples, the user selects an option on the user computing device 110 to download the application and the user computing device 110 receives the application over the network 120 from the account management computing system 140. In another example, the user selects an option not to download the application.

In another example, the account management computing system 140 extracts data associated with the audio token comprising public service data. For example, public service data comprises an alert issued by a public service or other service such as a traffic alert, emergency alert, or weather alert. In this example, the account management computing system 140 transmits the public service information to the user computing device 110 associated with the audio token. In this example, the user computing device 110 receives the public service information via the network 120 and displays the public service information. For example, the user computing device 110 displays public service information via the user interface 111 reading "county X schools are canceled today" or "road Y is closed due to a construction project."

In other examples, the account management computing system 140 extracts data associated with the audio token comprising a user profile or ID. In this example, the account management computing system 140 transmits the user profile or ID to the user computing device via the network 120. For example, the user computing device 110 receives the user profile or user ID via the network 120 and accesses and/or searches for information associated with the user ID, for example, a social network profile or contact information. In certain examples, the user profile or ID is only valid for a limited window of time, for example, ten minutes, during which the user computing device 110 may access the data associated with the user ID or profile via the network 120. For example, the advertising application 113 of the user computing device 110 is configured to submit the received user profile or user ID to a website to retrieve information. In this example, the advertising application 113 submits the user profile or user ID along with a current timestamp and the website determines if the current time stamp is within the window of time that the user profile or user ID is valid. If the website determines that the user profile or user ID is valid based on the current timestamp and the window of time, the website transmits information corresponding to the user profile or user ID to the user computing device 110 via the network 120. In this example, the user computing device 110 displays and/or saves the information received from the website.

In block 280, the user computing device 110 initiates a service request using the data associated with the audio token. The method for initiating a service request using data associated with an audio token is described in more detail hereinafter with reference to the method described in FIG. 5.

Figure 5:
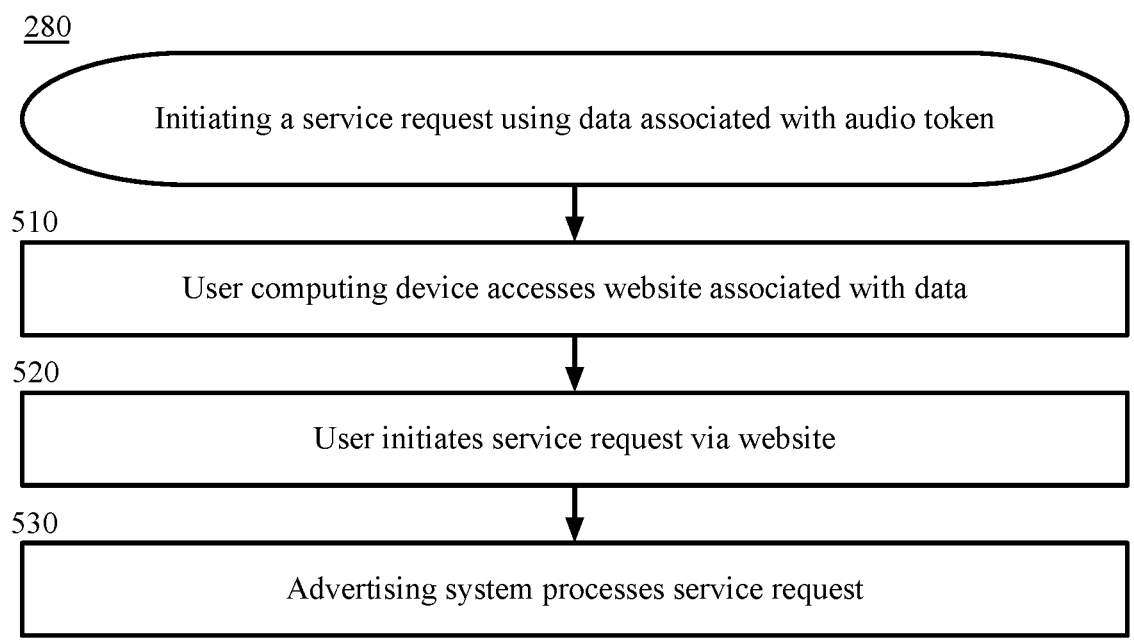
FIG. 5 is a block diagram depicting a method for initiating a service request using data associated with an audio token, in accordance with certain examples.

FIG. 5 is a block diagram depicting a method 280 for initiating a service request using data associated with an audio token, in accordance with certain examples. The method 280 is described with reference to the components illustrated in FIG. 1.

In block 510, the user computing device 110 accesses a website associated with the data. For example, the account management computing system 140 receives an audio token broadcasted by a broadcasting computing device 131 and retransmitted by a user computing device 110, and extracts data associated with the audio token comprising data. Example data extracted comprises a URL. In this example, the account management computing system 140 transmits the URL to the user computing device 110 over the network 120 along with instructions to the user computing device 110 to access a website associated with the URL.

In block 520, the user 101 initiates a service request via the website. For example, the website comprises a website associated with the advertising computing system 130 offering one or more product listings. In an example, the user selects one or more product listings on the website via the user computing device 110 to add to a virtual cart. In an example, the user initiates a transaction to purchase the items in the virtual cart using the user interface 111 of the user computing device 110. In an example, the advertising computing system 130 receives a transaction request from the user computing device 110 over the network 120 to purchase the items in the virtual card in response to the user initiating the transaction request via the user interface 111. In another example, the website comprises a website associated with the advertising computing system 130 offering one or more services. In this other example, the user selects one or more services offered on the website via the user computing device 110 to add to the virtual cart for purchase. In yet another example, the website comprises a website associated with the advertising computing system 130 that enables a user 101 to purchase and/or download a service application onto the user computing device 110 via the network 120.

In block 530, the advertising computing system 130 processes the transaction request. In an example, the website requests user account data from the user computing device 110 and the user provides the requested user account data via the user computing device 110 to the website. The advertising computing system 130 receives the provided user account data via the website and generates a transaction authorization request based on the received user account data. The advertising computing system 130 transmits the transaction authorization request to an issuer computing system associated with the user account data via the network and the issuer computing system receives the transaction authorization request. The issuer computing system 150 approves or denies the transaction authorization request and transmits notice of approval or denial of the transaction authorization request to the advertising computing system 131 via the network 120. In an example, the advertising computing system 131 receives the notice of approval or denial of the transaction authorization request over the network 120. The advertising computing system 131 communicates receipt data to the user computing device 140 via the network 120. For example, the advertising computing system 131 generates receipt data comprising notification whether the transaction authorization request was approved or denied by the issuer computing system 150.

Additional Examples

In another example, the user computing device 110 stores an audio token library on the user computing device 110. In this example, the user computing device 110 receives the audio token via the audio communication channel broadcast by the broadcasting computing device 131 at the location. In this example, the user computing device 110 determines an audio token identifier comprising a series of alphanumeric and/or symbolic characters from the received audio token. For example, the audio token comprises a sound input and the user computing device 110 translates the received sound input into the series of alphanumeric and/or symbolic characters if the user is signed into the advertising application 113. In an example, the user computing device 110 retrieves data associated with the audio token in the audio token library on the user computing device, for example, a URL, public service information, or transaction data, as in the examples described herein. In an example, the user computing device 110 communicates with the account management computing system 140 via the network 120 to receive an audio token library and to periodically receive updates to the audio token library from the account management computing system 140. An example audio token library comprises audio token identifiers associated with audio tokens configured by advertising systems 130 and advertising data associated with each of the audio tokens.

Other Examples

FIG. 6 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to transmit data to user computing devices via audio communication channels, comprising:
    receiving, by a first computing system, a request to generate an audio token associated with data comprising transaction details;
    generating, by the first computing system, the audio token;
    associating, by the first computing system, the audio token with the data;
    transmitting, by the first computing system, the audio token to a broadcasting computing device configured to broadcast the audio token via an audio communication channel;
    receiving, by the first computing system, a retransmitted audio token from a user computing device, the audio token being broadcast by the broadcast computing device to the user computing device via the audio communication channel and retransmitted by the user computing device to the first computing system via a network;
    determining, by the first computing system, that the data is associated with the retransmitted audio token; and
    obtaining, by the first computing system in response to determining that the data is associated with the retransmitted audio token, approval to process a payment transaction by, at least in part, transmitting one or more of the transaction details of the data to the user computing device.

2. The method of claim 1, wherein the data comprises one or more of text and images.

3. The method of claim 1, wherein the data comprises a uniform resource locator ("URL") associated with a website.

4. The method of claim 1, wherein the broadcasting computing device broadcasts the audio token via an audio component comprising a speaker.

5. The method of claim 1, wherein the audio token is received via a microphone component of the user computing device.

6. The method of claim 1, wherein the data associated with the audio token comprises one or more interface objects and information associated with each of the one or more interface objects, wherein the user computing device displays the one or more interface objects, and wherein the method further comprises:
    receiving, from the user computing device, a selection of a particular one of the one or more interface objects; and in response to receiving the selection of the particular one of the one or more interface objects, transmitting, to the user computing device, the information corresponding to the particular one of the one or more interface objects.

7. A non-transitory computer-readable medium having computer-executable program instructions embodied thereon, that when executed by a processor of a computing device, cause the computing device to:
    receive a request to generate an audio token for association with data comprising transaction details;
    associate the audio token with the data;
    transmit the audio token to a second computing system, wherein the second computing system utilizes a broadcasting computing device at a location to broadcast the audio token to a user computing device via an audio communication channel;
    receive the audio token from the user computing device, the audio token being from the broadcast by the broadcast computing device to the user computing device via an audio communication channel and being retransmitted by the user computing device to a computing system via a network;
    retrieve the data associated with the audio token; and
    obtain, in response to determining that the data is associated with the retransmitted audio token, approval to process a payment transaction by, at least in part, transmitting one or more of the transaction details of the data to the user computing device.

8. The non-transitory computer-readable medium of claim 7, wherein the data comprises one or more of text and images.

9. The non-transitory computer-readable medium of claim 7, wherein the data comprises a uniform resource locator ("URL") associated with a website.

10. The non-transitory computer-readable medium of claim 7, wherein the broadcasting computing device broadcasts the audio token via an audio component comprising a speaker.

11. The non-transitory computer-readable medium of claim 10, wherein the computing device further:
    receives the audio token via a microphone component.

12. The non-transitory computer-readable medium of claim 7, wherein the data associated with the audio token comprises one or more interface objects and information associated with each of the one or more interface objects, and the computing device further:
receives, from the user computing device, a selection associated with a particular one of the one or more interface objects; and
transmits, to the user computing device in response to receiving the selection associated with the particular one of the one or more interface objects, the information corresponding to the particular one of the one or more interface objects.

13. A system to transmit data to user computing devices via audio communication channels, comprising:
a storage device; and
a processor communicatively coupled to the storage device, wherein the processor executes application code instructions from the storage device causing the system to:
receive, by a first computing system, a request to generate an audio token for association with data comprising transaction details;
associate, by the first computing system, the audio token with the data;
transmit, by the first computing system, the audio token to a second computing system, wherein the second computing system configures a broadcasting computing device at a location to broadcast the audio token to a user computing device via an audio communication channel;
receive, by the first computing system, the audio token from the user computing device, the audio token being from the broadcast by the broadcast computing device to the user computing device via an audio communication channel and being retransmitted by the user computing device to the first computing system;
retrieve, by the first computing system, the data associated with the audio token; and
obtain, by the first computing system in response to determining that the data is associated with the retransmitted audio token, approval to process a payment transaction by, at least in part, transmitting one or more of the transaction details of the data to the user computing device.

14. The system of claim 13, wherein the data comprises one or more of text and images.

15. The system of claim 13, wherein the data comprises a uniform resource locator ("URL") associated with a website.

16. The system of claim 13, wherein the broadcasting computing device broadcasts the audio token via an audio component comprising a speaker.

17. The system of claim 16, wherein the system further comprises the second computing system and the broadcasting computing device.

18. The system of claim 15, wherein the data associated with the audio token comprises one or more interface objects and information associated with each of the one or more interface objects, and the system further:
receives, from the user computing device, a selection associated with a particular one of the one or more interface objects; and transmits, to the user computing device in response to receiving the selection associated with the particular one of the one or more interface objects, the information corresponding to the particular one of the one or more interface objects.

19. The system of claim 13, wherein the system further receives a request from the user computing device for data associated with the audio token with the audio token.

20. The method of claim 1, further comprising:
processing, by the first computing system, the payment transaction with a third-party system based, at least in part, on obtaining the approval for processing the payment transaction and one or more of the transaction details of the data associated with the audio token.

* * * * *